United States Patent [19]

Takebe

[11] Patent Number: 5,479,421
[45] Date of Patent: Dec. 26, 1995

[54] DATA INPUT CONTROL DEVICE FOR SERIAL CONTROLLER

[75] Inventor: Makoto Takebe, Hiratsuka, Japan

[73] Assignee: Kabushiki Kaisha Komatsu Seisakusho, Japan

[21] Appl. No.: 866,169

[22] PCT Filed: Dec. 27, 1990

[86] PCT No.: PCT/JP90/01724

§ 371 Date: Jun. 24, 1992

§ 102(e) Date: Jun. 24, 1992

[87] PCT Pub. No.: WO91/10302

PCT Pub. Date: Jul. 11, 1991

[30] Foreign Application Priority Data

Dec. 27, 1989 [JP] Japan .................. 1-343483

[51] Int. Cl.$^6$ .................................................. H04L 1/08
[52] U.S. Cl. .......................... 371/69.1; 371/20.6
[58] Field of Search .................. 371/69.1, 67.1, 371/20.1, 20.6

[56] References Cited

U.S. PATENT DOCUMENTS

| | | | |
|---|---|---|---|
| 3,781,792 | 12/1973 | Birkin | 371/69.1 |
| 4,019,172 | 4/1977 | Srodes | 371/69.1 |
| 4,133,504 | 1/1979 | Dobler | 371/69.1 |
| 4,245,212 | 1/1981 | Cirimele | 371/69.1 X |
| 4,606,029 | 8/1986 | Nagao | 371/69.1 |
| 4,633,468 | 12/1986 | Skatrud | 371/20.6 |
| 4,878,049 | 10/1989 | Ochiai | 371/5.5 |
| 5,105,426 | 4/1992 | Hagiwara | 371/20.1 |
| 5,163,056 | 11/1992 | Hagiwara | 371/20.6 X |
| 5,170,338 | 12/1992 | Moritoki | 364/131 |
| 5,204,865 | 4/1993 | Moritoki | 371/67.1 |

FOREIGN PATENT DOCUMENTS

| | | |
|---|---|---|
| 53-70606 | 6/1978 | Japan . |
| 54-143164 | 11/1979 | Japan . |
| 58-66445 | 4/1983 | Japan . |
| 61-139047 | 8/1986 | Japan . |
| 62-66443 | 4/1987 | Japan . |
| 1291548 | 11/1989 | Japan . |

OTHER PUBLICATIONS

International Search Report.
International Preliminary Examination.

Primary Examiner—Robert W. Beausoliel, Jr.
Assistant Examiner—Glenn Snyder
Attorney, Agent, or Firm—Welsh & Katz, Ltd.

[57] ABSTRACT

A data input control device for a serial controller wherein a plurality of nodes each having one or a plurality of sensors connected thereto are serially connected to each other with a main controller included therein, the main controller delivers a predetermined data frame signal at a period sufficiently shorter than the variation interval of data detected by the nodes, and each node serves to add to the data frame signal the data from sensors connected to the node. The main controller compares the sensor data contained in the data frame signal inputted thereinto for predetermined times on receipt of a data frame signal, and takes thereinto the sensor data as true data only when the results derived from the comparisons performed by the predetermined times coincide with each other. Therefore, errors caused over the whole path through which the data outputted from the sensors are inputted into the main controller via the respective nodes can be detected.

5 Claims, 5 Drawing Sheets

| | | STI | STO | DO1 | DO2 | DO3 | DO4 | DO5 | SP | CRC | ERR |
|---|---|---|---|---|---|---|---|---|---|---|---|
| (a) | S0 | STI | STO | DO1 | DO2 | DO3 | DO4 | DO5 | SP | CRC | ERR |
| (b) | S1 | STI | DI1 | STO | DO2 | DO3 | DO4 | DO5 | SP | CRC | ERR |
| (c) | S2 | STI | DI2 | DI1 | STO | DO3 | DO4 | DO5 | SP | CRC | ERR |
| (d) | S3 | STI | DI3 | DI2 | DI1 | STO | DO4 | DO5 | SP | CRC | ERR |
| (e) | S4 | STI | DI4 | DI3 | DI2 | DI1 | STO | DO5 | SP | CRC | ERR |
| (f) | S5 | STI | DI5 | DI4 | DI3 | DI2 | DI1 | STO | SP | CRC | ERR |

FIG.5

DATA INPUT CONTROL DEVICE FOR SERIAL CONTROLLER

TECHNICAL FIELD

The present invention relates generally to a serial controller wherein a main controller and a plurality of nodes are serially connected to each other, and at least one or a plurality of sensors or the like are connected to each node. More particularly, the Present invention relates to data input control to be executed at a main controller.

BACKGROUND ART

When a system such as a press machine, a machine tool, a construction machine, a ship, an aircraft, an unmanned conveying unit, an unmanned warehouse are central-controlled, a number of sensors for detecting the operative state of each section of the system and a number of actuators for controlling the state of the respective sections are required. For example, in the case of a press machine, the number of sensors and actuators exceeds 3000. For some systems, the number of sensors and actuators is greater.

As a central control system for central-controlling the aforementioned types of systems, it has been proposed a structure wherein a plurality of nodes are serially connected to each other, one or a plurality of sensors and actuators are connected to each node, and the respective nodes are successively connected to each other in the loop-shaped configurations via a main controller so that each node is controlled in response to a signal from the main controller.

In the case of the structure wherein the respective nodes are serially connected to each other in the above-described manner, there arises a problem as to how simultaneity of output from each node and simultaneity of control of each actuator are to be achieved. For example, in a structure wherein an address is allocated to each node and the node is controlled based on the allocated address, time delay attributable to the addressing process becomes a problem. For this reason, with respect to collection of outputs from the respective sensors and control of the respective actuators, satisfactory simultaneity cannot be achieved with the conventional structure.

Under such circumstances, the inventors abandoned technical concept of allocating an address to each node while employing a structure of serially-connected nodes, and proposed a serial controller in which each node is identified based on the order of connection of the respective nodes. In the serial controller of this type, since addressing process becomes unnecessary, time delay attributable to the addressing process is eliminated and a structure of the node is simplified.

The serial controller of this type is constructed as illustrated in FIG 4.

The serial controller is intended to be applied to a central control system for a press, and includes a host controller 200 adapted to totally control respective sections in the press. The serial controller further includes a main controller 100 which controls receiving and delivering of data between the main controller 100 and a plurality of serially connected nodes 10-1 to 10-N.

A group of sensors 1-1, 1- 2 . . . 1-N are arranged in respective sections of the press so as to detect the operative state of the respective sections of the press. Similarly, a group of actuators 2-1, 2-2 . . . 2-N are arranged in respective sections of the press so as to drive the respective sections of the press. The group of sensors 1-N and the group of actuators 2-N are connected to the node 10-N (N=1 to N). The nodes t0-1 to 10-N and the main controller 100 are serially connected to each other in a loop configuration.

FIG. 5 diagrammatically illustrates a frame structure of data frame signals usable in the central control system in case that the number N of nodes is five. These data frame signals are delivered from the main controller 100. After passing through the nodes 10-1 . . . 10-N, the signals return to the main controller 100. Incidentally, FIG. 5(a) shows a data frame signal generated immediately after it is outputted from the main controller 100, FIGS. 5(b), (c), (d) and (e) show data frame signals which are outputted from the nodes 10-1, 10-2, 10-3 and 10-4, and FIG. 5 (f) shows a data frame signal which is outputted from the node 10-5 (In the case of N=5, a signal which is fedback into the main controller 100).

The components of the data frame signal having a frame, structure as shown in FIG. 5 are as follows.

STI: first start code indicating the head position of an input data (sensor data) DI DI: input data (sensor data)

DIq: input data from a sensor connected to the qth node

STO: second start code indicating the head position of an output data (actuator driving data)

DO: output data (actuator driving data)

DOq: output data to an actuator connected to the qth node

SP: stop code indicating the end position of a data row

CRC: code for CRC check

ERR: code indicating the content and the position of error

As shown in FIGS. 5(b) to (f), in the nodes 10-1 to 10-N shown in FIG. 4, a detection data DIq of a sensor 1 connected to a node is added between a start code ST1 and a start code STO, and output data DOq to an actuator 2 connected to the node is taken out from behind the start code STO.

Therefore, in this system, when the main controller 100 sends a data frame signal containing an actuator control data DO as shown in FIG. 5(a) to the node 10-1, the data frame signal is successively transmitted to the node 10-1, the node 10-2, the node 10-3, the node 10-4 and to the node 10-5. Thus, the actuator control data DO in the data frame signal is distributed to a corresponding node and detection data obtained from the group of sensors at the respective nodes are taken into the data frame signal. As a result, by the time the data frame signal returns to the main controller 100, all the actuator control data D0 are taken out as shown in FIG. 5(f), and the detection data of the group of sensors are taken into the data frame signal.

In this manner, with the device of the present invention, the CRC code is contained in the data frame signal so as to detect a communication error among the nodes and between the node and main controller in the nodes and the main controller. In addition, the error code ERR is contained in the data frame signal so as to detect the disconnection of a signal line between nodes as well as errors in the node. The content of the error is carried by the error code ERR and is delivered.

According to the conventional error detecting system, however, in case that an error occurs in such a manner that the detection data changes from "0" to "1" or "1" to "0" due to noise in the signal line between a node and a group of sensors or noise in the sensor itself, there arises a problem that it cannot be judged whether the change is a true data variation or data variation attributable to an error.

Especially, in an industrial environment for a press, a machine tool, a construction machine, a ship, an aircraft, an unmanned conveying unit, an unmanned warehouse or the like to which the serial control device is applied, noises are likely taken into the system. Accordingly, demand for adequate countermeasures for solving the aforementioned problem have been raised from users.

The present invention has been made with the foregoing background in mind and its object is to provide a data input device for a serial control device capable of reliably detecting errors generated in the system including an error between the sensor and the node, and capable of preventing control error due to the error data.

DISCLOSURE OF THE INVENTION

According to the present invention, there is provided a data input control device for a serial controller wherein a plurality of nodes each having one or a plurality of sensors connected thereto are serially connected to each other with a main controller included therein, the main controller delivers a predetermined data frame signal at a period sufficiently shorter than the variation time interval of the data detected by each of the sensors, and each node serves to add to the data frame signal the data from sensors connected to the node, wherein the main controller includes comparing means for comparing the sensor data contained in the data frame signal inputted thereinto over a predetermined number of periods preset thereby by a predetermined number of times, and data inputting means for performing control in such a manner as to take thereinto the sensor data as true data only when the results derived from the comparisons performed by the predetermined number of times coincide with each other.

With such construction, when the main controller receives a data frame signal, the comparing means compares the sensor data contained in the data frame signal inputted thereinto by a predetermined number of times preset thereby per data for each node. The data inputting means performs control in such a manner as to take thereinto the sensor data as true data only when the results derived from the comparisons performed by the predetermined number of times coincide with each other.

When the results derived from the comparisons does not coincide with each other, the data representing the non-coincidence are not taken into the inputting means as true data. With such input control as mentioned above, when the sensor data vary correctly but not vary due to an error, the time when the sensor data are taken into the data inputting means delays for the time corresponding to the comparing process performed by the predetermined number of times. In this case, since the main controller delivers the data frame signal at a period sufficiently shorter than the variation time interval of the data detected by the sensors, there does not arise any particular problem.

Therefore, according to the present invention, errors be between the sensors and the nodes both of which are not directly connected to the main controller can centrally be detected, and moreover, a communication error between adjacent nodes and an error in each node can be also detected. In other words, errors caused over the whole path through which the data outputted from each sensor are inputted in the main controller via the respective nodes can be detected. In addition, according to the present invention, since the data available at the time when these errors are detected are substantially removed from the main controller, only correct data are out putted therefrom.

BRIEF DESCRIPTION OF THE DRAWINGS

FIG. 5 is a diagrammatical view which illustrates a manner of propagation of data frame signals.

BEST MODE FOR CARRYING OUT THE INVENTION

The present invention will be described in detail with reference to the accompanying drawings which illustrates a preferred embodiment of the present invention.

The embodiment to be described below is applied to a serial control device which has been described above with reference to FIG. 4 and FIG. 5.

Figure 1:
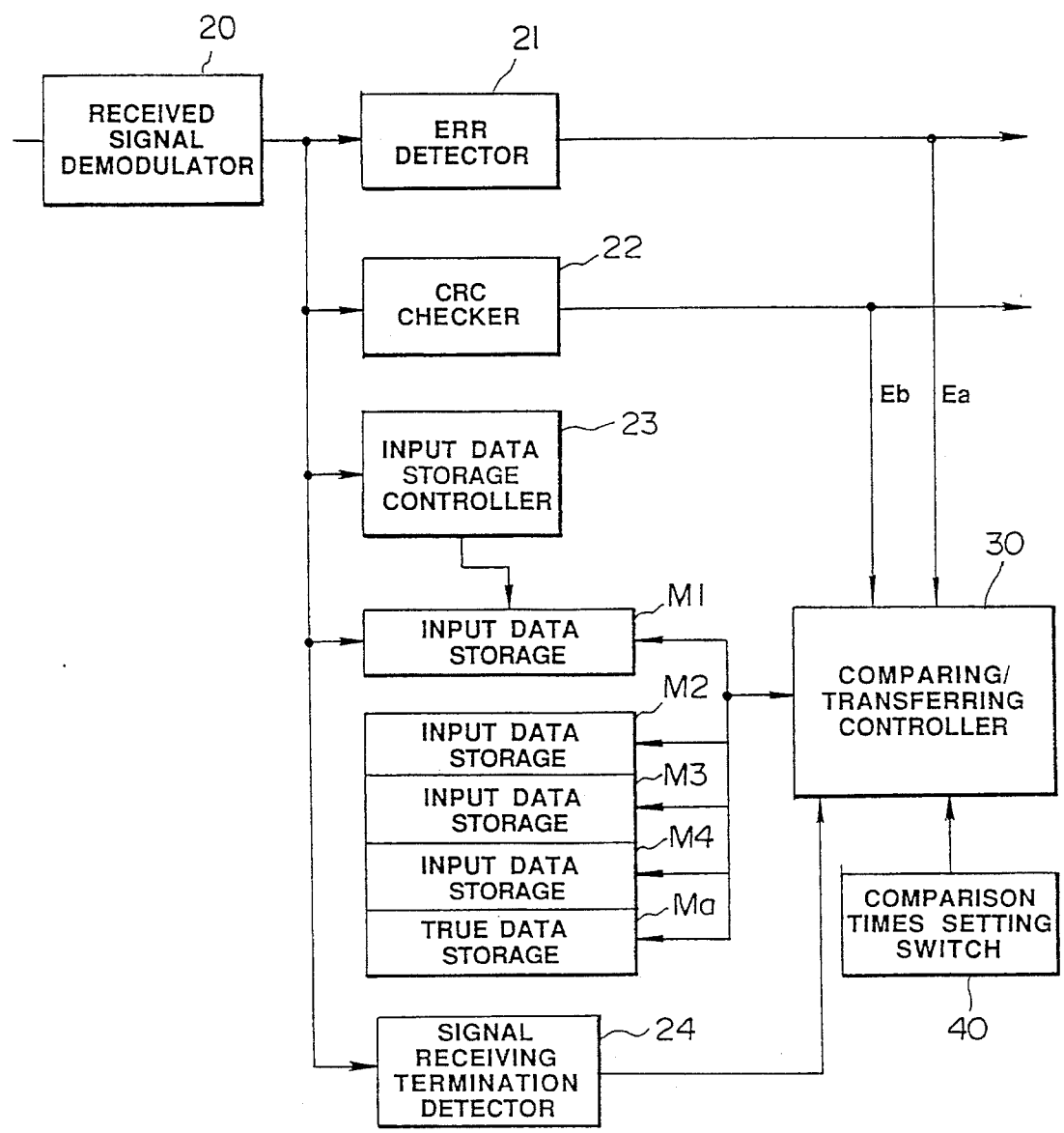
FIG. 1 is a block diagram which schematically illustrates an embodiment of the present invention.

FIG. 1 is a block diagram which illustrates the structure of a main controller 100. Especially, FIG. 1 illustrates the structure of the main controller 100 mainly on the signal receiving sides.

With the main controller 100 shown in FIG. 1, it is assumed that a delivery period of each data frame signal shown in FIG. 1 is sufficiently shorter than a variation time interval of the data from a plurality of sensors 1-1 to 1-N and a plurality of actuator 2-1 to 2-N connected to respective nodes. For this reason, a receiving interval (hereinafter referred to as a sampling period) of data frame signals successively transmitted through the respective nodes and inputted into the main controller 100 becomes sufficiently shorter than the variation interval of the data from the sensors and the actuators.

Referring to FIG. 1, a received signal demodulating section 20 serves to allow a data frame signal inputted thereinto to be subjected to predetermined demodulation. A demodulation output from the received signal demodulating section 20 is supplied to an ERR detecting section 21, a CRC check section 22, an input data store controlling section 23, an input data storing section M1 and a signal receiving termination detecting section 24.

The ERR detecting section 21 discriminates an error code ERR in each data frame signal shown in FIG. 1. When it is found that a certain error arises in the data frame signal, an error generation signal Ea is inputted into a comparing/transferring controller 30.

The CRC check section 22 detects a communication error between the main controller 100 and the node 10-N at the preceding stage by performing CRC check with the aid of a CRC code in each data frame signal shown in FIG. 5. When the error is detected by performing the CRC check, a CRC error generation signal Eb is inputted into the comparing/transfer ring signal Eb.

Figure 4:
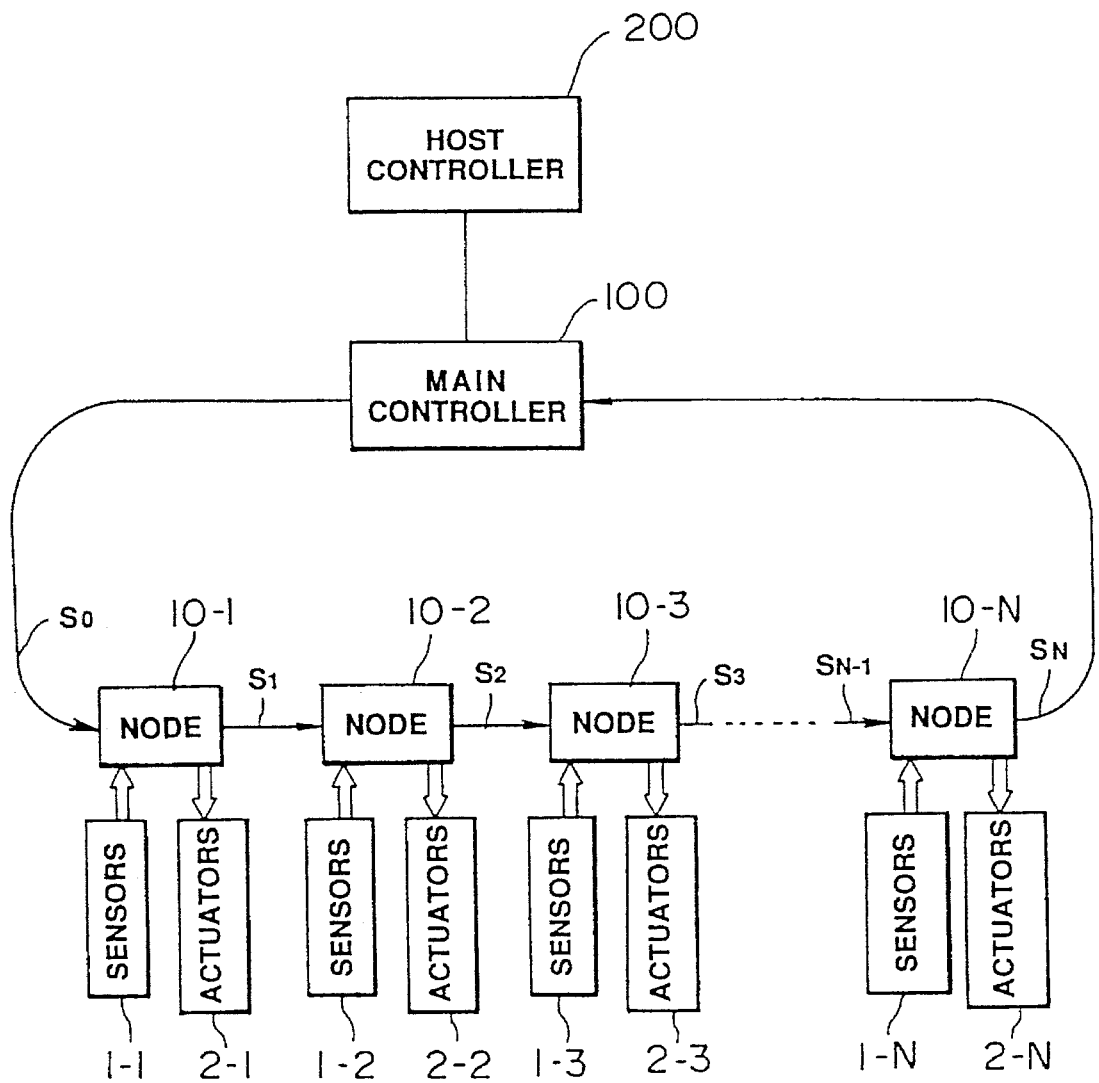
FIG. 4 is a block diagram which illustrates the whole structure of the serial controller.

The content of error detection in the ERR detecting section 21 (kind of error, position where error occurs) and the results derived from the checking at the CRC check section 22 are delivered to a host controller 200 shown in FIG. 4 so that the history representing the error detecting and the CRC check is memorized in the host controller 200 which in turn executes predetermined error correction.

The input data store controlling section 23 detects, e.g., a start code STI in a data frame signal shown in FIG. 5, and activates the input data storing section M1 from the time of the detection so as to store sensor data $DI_N$ to $DI_1$ in the data frame signal in the input data storing section M1.

Input data storing sections M2 to M4 serve as buffers arranged for the purpose of comparing data over a plurality of sampling periods and store the sensor data $DI_N$ to $DI_1$ therein. Since four input data storing sections M1 to M4 are arranged, sensor data corresponding to a maximum of four sampling periods can be stored in the input data storing sections M1 to M4.

A true data storing section Ma serves as a buffer for storing true data which is determined not to be data derived from an error, and only sensor data stored in the true data storing section Ma are delivered to the host controller 200.

The signal receiving termination detecting section 24 detects that receiving of a series of data frame signals is terminated, and the detection signal is inputted into the comparing/transferring controller 30.

A comparison time setting switch 40 is arranged to set the number of data comparisons over a plurality of sampling periods so as to recognize the sensor data inputted thereinto as true data, and the number of data comparisons can arbitrarily be set by an operator. In this embodiment, since four input data storing sections M1 to M4 are arranged, a maximum set value for the comparison times Cn is three. In this case, it is assumed that the comparison times Cn is one, i.e., Cn=1.

Figure 2:
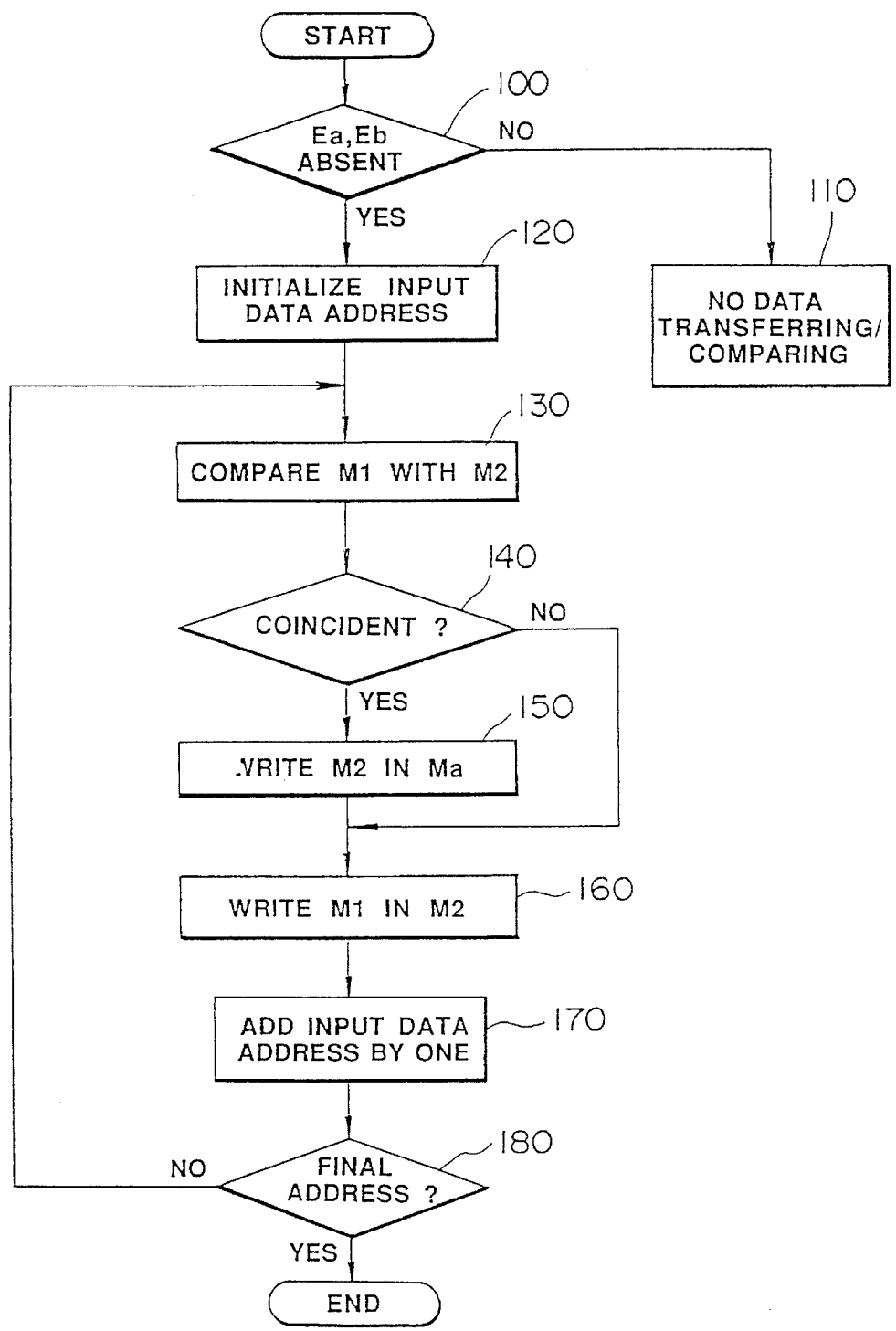
FIG. 2 is a flowchart which illustrates a mode of operation of a data input control device for a serial controller in accordance with the embodiment of the present invention.

The comparing/transferring controller 30 performs operations such as an operation of comparing sensor data stored in the input data storing sections M1 to M4 for each bit over a plurality of sampling periods as many times as comparison times Cn set by the comparison time setting switch 40, an operation of determining as true data only the sensor data coinciding with each other as a result of the comparison and then storing the true data in the true data storing section Ma, and an operation of transferring data between the input data storing sections M1 to M4 and between the input data storing sections M1 to M4 and the true data storing section Ma. Detail of the operations as mentioned above will be described later with reference to a flowchart shown in FIG. 2. In this case, the comparison times is one, i.e., Cn=1, as mentioned above. Therefore, in this case, the input data storing sections M3 and M4 do not function.

When a data frame signal is inputted into the received signal demodulating section 20 of the main controller 100, the input data storing section 23 detects a STI code in the data frame signal, and the input data storing section M1 is activated from the time point of the foregoing detection. Thus, sensor data $DI_N$ to $DI_1$ representing the data frame signal are stored in the input data storing section MI.

Thereafter, when the detection signal is inputted into the comparing/transferring controller 30 from the signal receiving termination detecting section 24, the comparing/transferring controller 30 determines whether an error occurrence is reported from the node in response to the detection signals Ea and Eb of the ERR detecting section 21 and the CRC check section 22. In addition, the comparing/transferring controller 30 determines whether a CRC error occurs between the present node and the node at the preceding stage (step 10i0)i. When it is found that a certain error occurs, the comparing/transferring controller 30 does not perform data transference and comparing operations as mentioned below (step 110). More specifically, when the error occurs, the comparing/transferring controller 30 performs only the operation of storing the sensor data $DI_N$ to $DI_1$ in the input data storing section MI. When a data frame signal is inputted into the comparing/transferring controller 30 at the next sampling period, the data at the time of error occurrence which have been stored in the input data storing section M1 are updated with the data at the next sampling period. In other words, the data at the time of error occurrence are abandoned.

However, when the error does not occur, the comparing/transferring controller 30 sets the address bit on the sensor data in the data frame signal to an initial value (step 120). By adding the initial address to the input data storing sections M1 and M2, the comparing/transferring controller 30 reads out the sensor data (one bit) corresponding to the initial address stored in the input data storing section M1 and the sensor data (one bit) corresponding to the initial address stored in the input data storing section M2 (step 130). This initial address corresponds to the address of the sensor data of one bit present directly after the STI code in the data frame signal shown in FIG. 5.

At the time of comparison, usually, the sensor data inputted at the preceding sampling period are stored (the foregoing term "usually" means the time other than the time when the error signals Ea and Eb are generated).

Specifically, at the step 130, the sensor data of one bit corresponding to the initial address in the data frame signal received at the preceding time is compared with the sensor data corresponding to this initial address in the data frame signal received at this time.

As a result of the comparison, when both the sensor data coincide with each other (step 140), the comparing/transferring controller 30 determines that the one bit data at the preceding time stored in the input data storing section M2 is correct data, writes it in the corresponding memorizing region of the true data storing section Ma, and writes the data of one bit at this time stored in the input data storing section M1 in the corresponding memorizing region of the input data storing section M2 (step 150 and 160).

However, as a result of the comparison at the step 130, when both the data do not coincide with each other, the comparing/transferring controller 30 does not perform the writing of the data in the true data storing section Ma but performs only the writing of the data of one bit at this time stored in the input data storing section M1 in the corresponding region of the input data storing section M2 (step 160).

Figure 3:
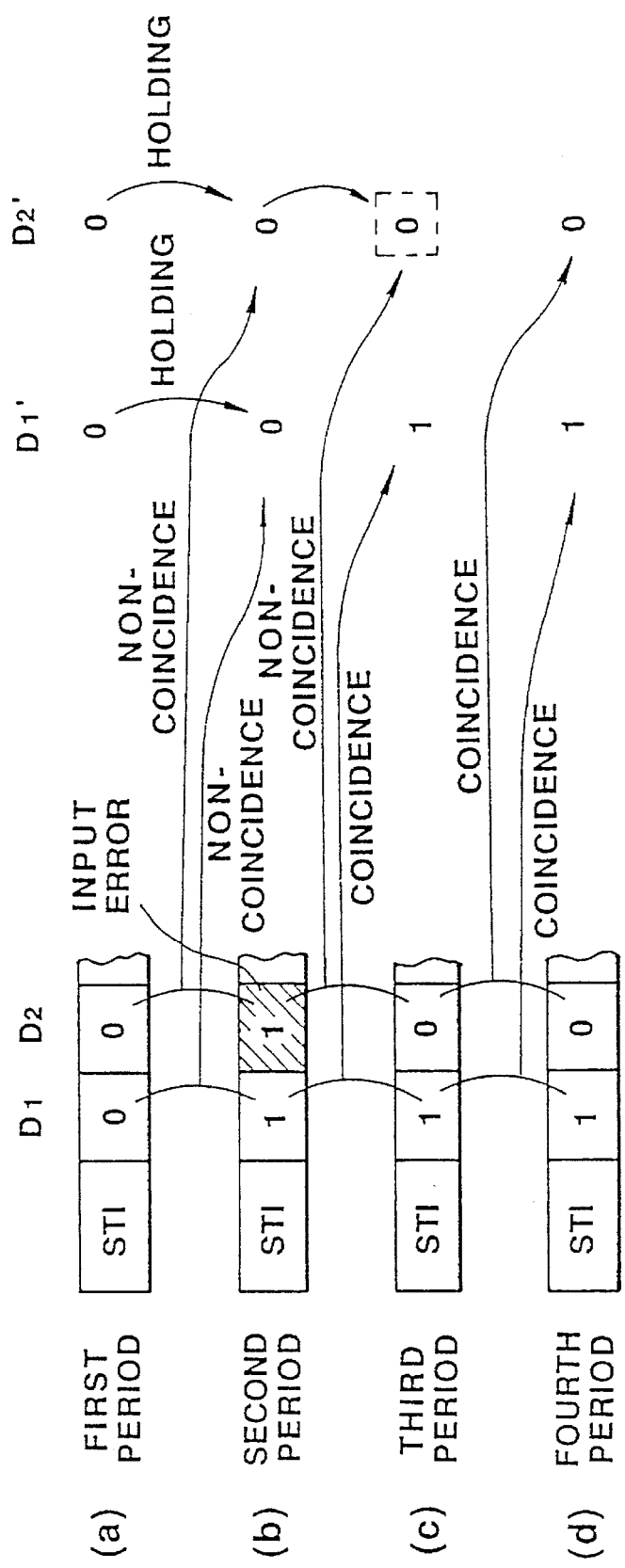
FIG. 3 is a diagrammatical view which illustrates by way of an example a manner of updating data with the data input control device.

FIG. 3 illustrates an example of inputting the sensor data D1 and D2 each having two bits subsequent to STI code in each data frame signal over four sampling periods. In other words, FIG. 3 illustrates a case that the data D1' and D2' shown on the right-hand side of the drawing are written in the true data storing section Ma as a result of the comparison.

In this example, an error occurs in the data D2 at the second period designated by hatched lines. However, the error data are not written in the true data storing section Ma. At this time, the data for the preceding sampling period are kept as held in the true data storing section Ma. In other words, when the results derived from the aforementioned comparison coincide with each other, the content of the data stored in the true data storing section Ma are updated with the data at the preceding period. However, when the results derived from the comparison do not coincide with each other, the content of the data in the true data storing section Ma is not updated but the data written before the preceding sampling period are held in the true data storaging section Ma.

In any case, when the operation at the step 160 is terminated, the comparing/transferring controller 30 increases the address bit on the sensor data in the data frame signal by one (step 170). As long as the address bit which has been in creased by one is not a final address (step 180), the comparing/transferring controller 30 reads the sensor data of one bit corresponding to the value (the initial address plus one) stored in the input data storing section M1 and the sensor data of one bit corresponding to the initial address plus one stored in the input data storing section M2 so that both the sensor data one bits are compared with each other again (step 130). When both the sensor data of one bit coincide with each other (step 140), the comparing/transferring controller 30 writes the one bit data at the preceding time stored in the input data storing section M2 in the corresponding region of the true data storing section Ma, and writes the one bit data at this time stored in the input data storing section M1 in the corresponding memorizing region of the input data storing section M2 in the same manner as mentioned above (steps 150 and 160). As a result of the comparisonat the step 130, when both the data do not coincide with each other, the comparing/transferring controller 30 does not perform writing of the data in the true data storing section Ma but performs only writing of the one bit data at this time stored in the input data storing section M1 in the corresponding memorizing region of the input data storing section M2 in the same manner as mentioned above (step 160).

The comparing/transferring controller 30 repeatedly executes the aforementioned operation until the final bit of the sensor data contained in the inputted frame signal is reached.

Thereafter, the data stored in the true data storing section Ma by performing the above-described operations are delivered to the host controller 200 shown in FIG. 4 which in turn executes data analyzing operation.

As is apparent from the above description, according to the embodiment of the present invention, when a data frame signal is received, the main controller 100 compares sensor data contained in the inputted data frame signal for each corresponding bit data and takes thereinto the respective sensor data as true data only when the result of the comparison reveals that both the data coincide with each other. However, the sensor data is not taken into as data when the result of the comparison reveals that both the data do not coincide with each other. Thus, in contrast to the prior art, the main controller 100 can reliably detect errors attributable to various kind of causes inclusive of a case that the sensor data vary due to the noise appearing between a node and a sensor or due to the error caused by a sensor itself. Moreover, the Sensor data associated with the error can be excluded. Consequently, only correct data with the error excluded therefrom are inputted into the host controller 100, whereby adequate actuator control can be performed based on the correct data.

With the device in accordance with the embodiment of the present invention, when the sensor data vary practically not due to the error, the data take-in time delays for a period of time corresponding to a single sampling period. In this case, since the main controller 100 delivers each data frame signal at a period sufficiently shorter than variation time interval of the detection data of each sensor as mentioned above, there does not practically arise any particular problem.

In the foregoing embodiment, the comparing/transferring controller 30 compares and updates sensor data with a bit as a unit. Alternatively, as this unit employable for the comparison and the updating, sensor data contained in a single node may be used. Further, sensor data contained in all the nodes may be used as a unit.

The present invention should not be limited only to the system wherein all the nodes are connected to each other in the loop configuration as shown in the drawings with reference to the above-described embodiment, but it may be applied to a system wherein no des are serially connected to each other.

As shown in FIG. 5, a frame structure wherein data are received and delivered by insertion and addition of data in response to each data frame signal is employed for the embodiment. Alternatively, a frame structure wherein an address is allocated to each node and the data region corresponding to each of the data addresses is separately included in the data frame signal may be employed for carrying out the present invention.

INDUSTRIAL APPLICABILITY

Present invention is advantageously employable for a system for central-controlling a press, a machine tool, a construction machine, a ship, an aircraft, an unmanned conveying unit, an unmanned warehouse or the like.

I claim:

1. A data input control device for a serial controller wherein a plurality of nodes each having one or a plurality of sensors connected thereto are serially connected to each other with a main controller included therein, said main controller delivers a predetermined data frame signal at a period sufficiently shorter than the variation interval of data detected by the sensors, and each of the nodes delivers data from a sensor connected to the node while the data is carried in the data frame signal, characterized in that the main controller includes:

sensor data storing buffers arranged in plural stages each having a memory capacity capable of storing all sensor data from the sensors connected to the nodes, for temporarily storing data from the plurality of sensors contained in the data frame signal over a plurality of sampling periods;

a true data storing buffer having a memory capacity capable of storing all sensor data from sensors connected to the plurality of nodes, for storing the sensor data which have been determined as true data;

data reading means for performing data reading operation of reading the data from one sensor over a plurality of sampling periods by outputting a read address corresponding to a storage region where the data from a same sensor are stored to the sensor data storing buffers arranged in plural stages;

a single comparing means for comparing data from one sensor over a plurality of sampling periods, said data being read by the data reading means; and transferring/memorizing means for transferring data to be compared stored in sensor data storing sections arranged in the plural stages so as to store the data in a storage region corresponding to a sensor data storing section of the next stage upon completion of the comparison by the comparing means, and transferring to a storage region corresponding to the true data storing buffer data to be compared in one of the sensor data storing sections arranged in plural stages so as to store the data in a storage region, corresponding to the true data storing buffer, only when results derived from the comparison performed by the comparing means coincide with each other, and wherein the data reading means successively updates read addresses for the sensor data storing buffers arranged in plural stages by one each time a comparison is completed by the comparing means; and the transferring/memorizing means successively updates the access addresses, for the sensor data storing buffers arranged in plural stages and the true data storing buffer, by one each time the transferring/memorizing operation is completed, said storing of sensor data as true data being performed independently for each sensor data.

2. A data input control device for a serial controller as claimed in claim 1, wherein each of the nodes delivers an error code indicative of content of an error such that the error code is carried by the data frame signal each time an error is detected;

wherein the main controller further includes error detecting means for determining the presence or absence of an error based on the error code contained in the data frame signal and detecting a communication error so as to output an error detection signal when the presence of an error is determined or a communication error is detected; and wherein the transferring/memorizing means transfers data to be compared in one of the sensor data storing sections arranged in plural stages to a corresponding storage region of the true data storing buffer so as to store the data in the storage region only other under the situation that the error detecting means does not when comparison results by the comparing means coincide with each other under the situation that the error detecting means does not output an error detection signal.

3. A data input control device for a serial controller as claimed in claim 1, wherein the comparing means compares the sensor data over the plurality of periods with data for each node as a unit, and a data take-in control is performed for each data of each node as a unit.

4. A data input control device for a serial controller wherein a plurality of nodes each having one or a plurality of sensors connected thereto are serially connected to each other with a main controller included therein, the main controller delivers a predetermined data frame signal containing an error code at a period sufficiently shorter than a variation interval of the data detected by each of the sensors, each node delivers data from each of the sensors connected to the node while the data are carried by the data frame signal, and the content of the error is carried by the error code when an error is detected, the main controller including:

error detecting means for determining the presence or absence of an error based on the error code contained in the data frame signal and detecting a communication error so as to output an error detection signal when the presence of an error is determined or a communication error is detected;

comparing means for comparing an inputted sensor data contained in the data frame signal over a predetermined sampling period as many times as predetermined time; and data inputting means for performing a data take-in control in such a manner as to take thereinto the sensor data as true data only when the results derived from the comparisons performed by the predetermined times coincide with each other under the condition that no error detection signal is outputted from the error detecting means, wherein the comparing means compares the sensor data over the plurality of periods for each corresponding bit as a unit, and the data take-in control is performed by the data inputting means for each bit as a unit.

5. A data input control device for a serial controller as claimed in claim 4, wherein the comparing means compares the sensor data over the plurality of periods with data for each node as a unit, and the data take-in control is performed with by the data inputting means for each data of each node as a unit.

* * * * *